US011380931B2

(12) United States Patent
Zhang et al.

(10) Patent No.: US 11,380,931 B2
(45) Date of Patent: Jul. 5, 2022

(54) COMPOSITE ELECTRODE PLATE AND BATTERY CELL USING THE SAME

(71) Applicant: Ningde Amperex Technology Ltd., Ningde (CN)

(72) Inventors: Yi-Bo Zhang, Ningde (CN); Li Xiang, Ningde (CN); Bin Wang, Ningde (CN); Qiaoshu Hu, Ningde (CN)

(73) Assignee: Ningde Amperex Technology Ltd., Ningde (CN)

( * ) Notice: Subject to any disclaimer, the term of this patent is extended or adjusted under 35 U.S.C. 154(b) by 252 days.

(21) Appl. No.: 16/528,773

(22) Filed: Aug. 1, 2019

(65) Prior Publication Data

US 2020/0403265 A1 Dec. 24, 2020

(30) Foreign Application Priority Data

Jun. 21, 2019 (CN) ......................... 201910543862.1

(51) Int. Cl.

| | |
|---|---|
| ***H01M 10/04*** | (2006.01) |
| ***H01M 10/0585*** | (2010.01) |
| ***H01M 4/13*** | (2010.01) |
| ***H01M 10/052*** | (2010.01) |

(52) U.S. Cl.

CPC ........... *H01M 10/052* (2013.01); *H01M 4/13* (2013.01); *H01M 10/0413* (2013.01); *H01M 10/0436* (2013.01); *H01M 10/0585* (2013.01)

(58) Field of Classification Search

CPC ........... H01M 10/052; H01M 10/0413; H01M 10/0585; H01M 10/0436; H01M 4/13

See application file for complete search history.

(56) References Cited

U.S. PATENT DOCUMENTS

2003/0224244 A1* 12/2003 Inda .................... H01M 10/052 429/126
2006/0105243 A1* 5/2006 Okamura ................ H01M 4/64 429/234
2012/0315537 A1* 12/2012 Ravdel .................. H01M 4/668 429/209

FOREIGN PATENT DOCUMENTS

CN 108110257 A 6/2018

* cited by examiner

*Primary Examiner* — Osei K Amponsah
(74) *Attorney, Agent, or Firm* — Maier & Maier, PLLC

(57) ABSTRACT

A composite electrode plate of increased robustness and with better electrical properties for incorporation in a battery cell includes a composite current collector, a positive active material layer, a negative active material layer, a first isolation layer, and a second isolation layer. The composite current collector is disposed between the positive active material layer and the negative active material layer. The first isolation layer connects to a surface of the positive active material layer away from the composite current collector. The second isolation layer connects to a surface of the negative active material layer away from the composite current collector.

20 Claims, 4 Drawing Sheets

COMPOSITE ELECTRODE PLATE AND BATTERY CELL USING THE SAME

FIELD

The subject matter herein generally relates to electrode plates, and more particularly, to a composite electrode plate and a battery cell using the composite electrode plate.

BACKGROUND

Due to high energy density, high operating voltage, low self-discharge, small volume, and light weight, lithium batteries have widely used in consumer electronics. With the rapid development of electric vehicles and mobile devices, safety of such a lithium battery has become a great concern.

The lithium battery may include an isolation film that isolates electrons and conducts ions. However, the isolation film may shrink under high temperature (greater than 110 degrees Celsius for example). Under such a circumstance, a portion of the positive electrode plate may come into a direct contact with the negative electrode plate and cause a short circuit. Furthermore, when the lithium battery is dropped, the electrolyte impact may cause the edges of the isolation film to fold into the gap between the positive electrode plate and the negative electrode plate, which may lead the positive plate to come into a direct contact with the negative plate and safety problem arises.

SUMMARY

What is needed, is a composite electrode plate having improved safety and cycling properties, and a battery cell using the composite electrode plate.

The present disclosure provides a composite electrode plate comprising a composite current collector; a positive active material layer; a negative active material layer, the composite current collector being disposed between the positive active material layer and the negative active material layer; a first isolation layer connected to a surface of the positive active material layer away from the composite current collector; and a second isolation layer connected to a surface of the negative active material layer away from the composite current collector.

The present disclosure further provides battery cell comprising a composite electrode plate, the composite electrode plate wound or stacked to form the battery cell, the composite electrode plate comprising a composite current collector; a positive active material layer; a negative active material layer, the composite current collector being disposed between the positive active material layer and the negative active material layer; a first isolation layer connected to a surface of the positive active material layer away from the composite current collector; and a second isolation layer connected to a surface of the negative active material layer away from the composite current collector.

The first isolation layer and the second isolation layer are in substitution for the existing isolation film that isolates electrons and conducts ions. The first isolation layer and the second isolation layer have a stronger strength of bonding to the electrode plate compared to the existing isolation film. Thus, the battery cell has an improved safety when the battery cell is dropped or subjected to high temperature. The battery cell has stronger resistance to thermal shock and drop, and better chemical stability. Moreover, a total thickness of the composite electrode plate can be decreased, which increases the energy density of the battery cell.

BRIEF DESCRIPTION OF THE DRAWINGS

Implementations of the present disclosure will now be described, by way of embodiments, with reference to the attached figures.

DETAILED DESCRIPTION

Figure 1:
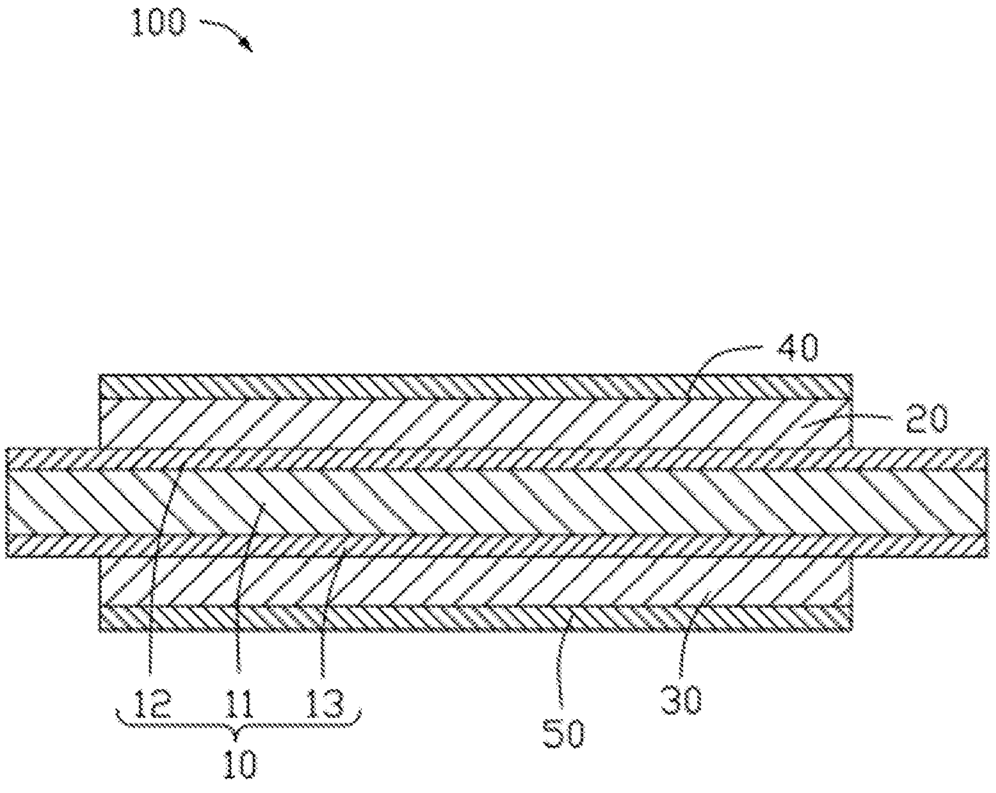
FIG. 1 is a cross-sectional view of an embodiment of a composite electrode plate.

Implementations of the disclosure will now be described, by way of embodiments only, with reference to the drawing. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein is to provide a thorough understanding of the embodiments described herein, but not to be considered as limiting the scope of the embodiments.

Implementations of the disclosure will now be described, by way of embodiments only, with reference to the drawing. It should be noted that the details and features in the embodiments of the present disclosure may be combined with each other without conflict.

FIG. 1 illustrates an embodiment of a composite electrode plate 100. The composite electrode plate 100 includes a composite current collector 10, a positive active material layer 20, a negative active material layer 30, a first isolation layer 40, and a second isolation layer 50. The composite current collector 10 is disposed between the positive active material layer 20 and the negative active material layer 30. The first isolation layer 40 is connected to a surface of the positive active material layer 20 facing away from the composite current collector 10. The second isolation layer 50 is connected to a surface of the negative active material layer 30 facing away from the composite current collector 10.

By coating active materials on the composite current collector 10 to form the positive active material layer 20 and the negative active material layer 30, the existing positive and negative electrode plates are combined together to form a single composite electrode plate 100. Thus, a battery cell 400 (shown in FIG. 6) can be formed by winding the single composite electrode plate 100 or by stacking the same composite electrode plates 100 together. The manufacturing process is simplified, which increases the manufacturing efficiency and the product yield and reduces the cost. Moreover, the first isolation layer 40 and the second isolation layer 50 are in substitution for the existing isolation film that isolates electrons and conducts ions. The first isolation layer 40 and the second isolation layer 50 have a stronger strength of bonding (bonding strength) to the electrode plate compared to the existing isolation film. Thus, the battery cell 400 has an improved safety when the battery cell 400 is dropped or subjected to high temperature. The battery cell 400 has stronger resistance to thermal shock and drop and better chemical stability. Moreover, a total thickness of the composite electrode plate can be decreased, which increases the energy density of the battery cell 400.

In at least one embodiment, the positive active material layer 20 and the negative active material layer 30 can be formed by coating active materials on the composite current collector 10 and drying and cold pressing the coating of active materials. The composite current collector 10 can include primary coating layers (not shown) on the surfaces thereof. The primary coating layer includes a conductive material (such as carbon nanotubes, conductive carbon, or graphene) and a binding agent. The primary coating layer can further increase the number of ion channels on the surface of the composite electrode plates 100 and the electrochemical performance, and increase the bonding strength between the active material and the composite current collector 10.

Figure 2:
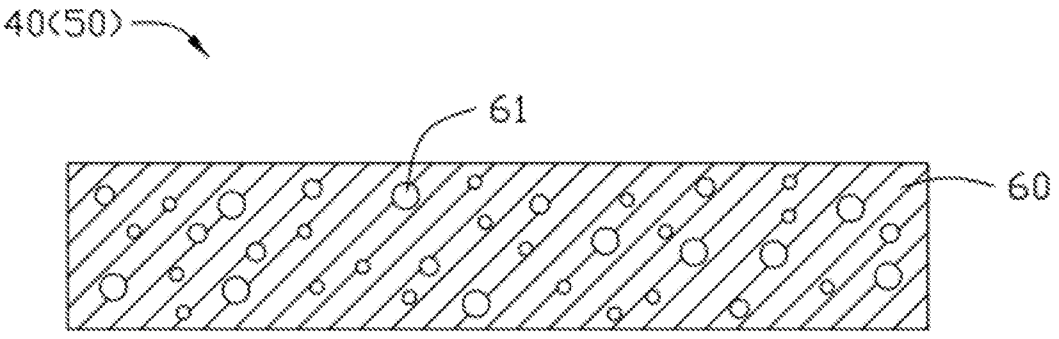
FIG. 2 is a cross-sectional view of an embodiment of an isolation layer (first or second isolation layer) of the composite electrode plate of FIG. 1.
Figure 3:
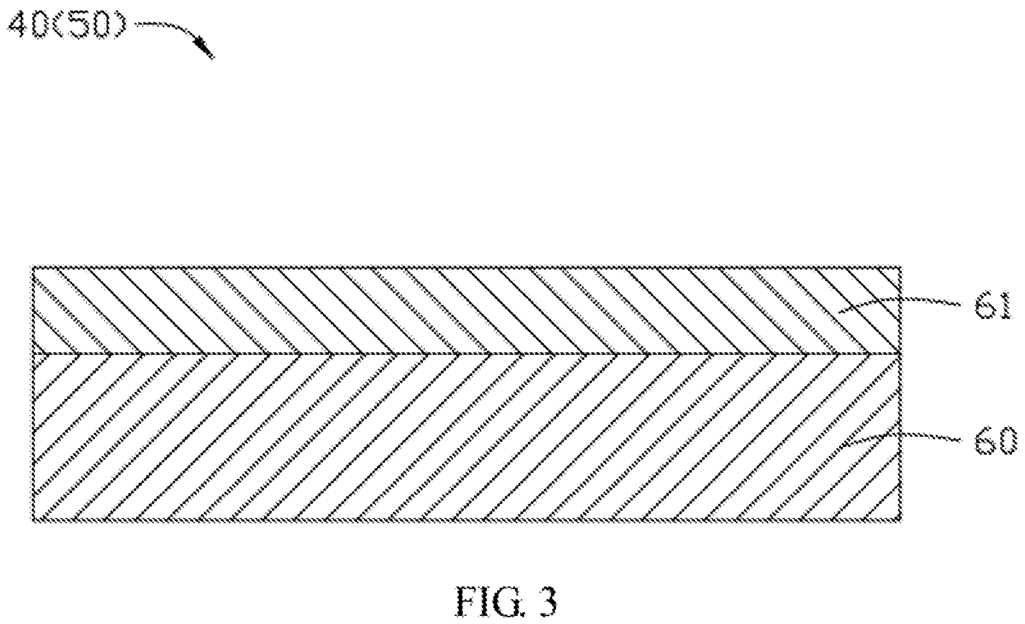
FIG. 3 is a cross-sectional view of another embodiment of an isolation layer (first or second isolation layer) of the composite electrode plate of FIG. 1.

Referring to FIGS. 2 and 3, each of the first isolation layer 40 and the second isolation layer 50 includes a porous layer 60, which prevents the ion channels from being obstructed, thereby increasing the liquid retention capacity of the battery. The porosity of the porous layer 60 is 30% to 95%. When the porosity of the porous layer 60 is greater than or equal to 30%, the porous layer 60 prevents the ion channels from being obstructed and allows the battery cell 400 to normally work. When the porosity of the porous layer 60 is less than or equal to 95%, the porous layer 60 increases the stability and mechanical strength of the composite electrode plate 100, and increases the resistance to puncture.

In at least one embodiment, the porous layer 60 is a non-woven fabric layer formed by spinning technologies such as electrospinning or air spinning. The non-woven fabric layer includes a plurality of fibers that are randomly arranged. The non-woven fabric layer has a uniform thickness and weight, and the porosity of the non-woven fabric layer can reach 80%. Electrospinning is a fiber manufacturing process. Under a strong electric field, the droplets of the polymer solution at the needle change from a spherical shape to a conical shape, and the nanometer-scaled fibers can be formed by extending from the conical tip. The principle of air spinning is similar to that of electrospinning. The polymer solution generates a negative pressure under the rapid flow of air outside the needle. The droplets at the needle are rapidly extruded and extended under the negative pressure to form the fibers. Specifically, the non-woven fabric layer can be formed by air spinning, since air spinning has a higher manufacturing rate (may be about ten times greater than that of electrospinning) which is advantageous for the manufacture of nanofibers with large-diameter, and does not need a large voltage in the process to improve safety.

Furthermore, the non-woven fabric layer can be made of polymers, and more specifically, the non-woven fabric layer can be made of lithium ions conducting material. In at least one embodiment, the non-woven fabric layer can be made of a material selected from a group consisting of polyvinylidene difluoride, polyvinylidene fluoride (PVDF), polyimide, polyamide, polyacrylonitrile (PAN), polyethylene glycol, polyphenylene oxide (PPO), polyoxyethylene, polyethylene oxide (PEO), poly propylene carbonate (PPC), polymethyl methacrylate (PMMA), polyethylene terephthalate, poly(vinylidene difluoride-co-hexafluoropropylene), poly(vinylidene fluoride-hexafluoropropylene) (PVDF-HFP), poly(vinylidene difluoride-co-chlorotrifluoroethylene), and derivatives thereof.

The fiber of the non-woven fabric layer has a diameter of 10 nanometers to 2 micrometers. The non-woven fabric layer can have fibers of different diameters.

The thickness of the non-woven fabric layer is 1 micrometer to 20 micrometers. When the thickness of the non-woven fabric layer is less than or equal to 20 micrometers, the total thickness of the first isolation layer 40 and the second isolation layer 50 can be no more than the thickness of the existing isolation film, which can increase the energy density of the battery cell 400.

Referring to FIG. 2, in at least one embodiment, the first isolation layer 40 and/or the second isolation layer 50 can further include a protection layer 61. The protection layer 61 fills in pores of the porous layer 60. The protection layer 61 includes an inorganic material that can isolate electrons and ensure the isolation performance of the first isolation layer 40 and/or the second isolation layer 50, and can further increase the mechanical strength of the first isolation layer 40 and/or the second isolation layer 50. The inorganic material can also conduct lithium ions. Furthermore, the protection layer 61 can slow down the self-discharge rate of the battery cell 400.

Furthermore, the inorganic material can be selected from a group consisting of oxide, hydroxide, lithium compound, and any combination thereof. Specifically, the oxide can be selected from a group consisting of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$, and any combination thereof. The hydroxide can be selected from a group consisting of boehmite, magnesium hydroxide, aluminium hydroxide, and any combination thereof. The lithium compound can be selected from a group consisting of lithium phosphate ($Li_3PO_4$), lithium titanium phosphate ($Li_xTi_y(PO_4)_3$, wherein $0<x<2$, $0<y<3$), lithium aluminum titanium phosphate ($Li_xAl_yTi_z(PO_4)_3$, wherein $0<x<2$, $0<y<1$, $0<z<3$), $Li_{1+x+y}(Al,Ga)_x(Ti,Ge)_{2-x}Si_yP_{3-y}O_{12}$ (wherein $0\leq x\leq 1$, $0\leq y\leq 1$), lithium lanthanum titanate ($Li_xLa_yTiO_3$, wherein $0<x<2$, $0<y<3$), lithium germanium thiophosphate ($Li_xGe_yP_zS_w$, wherein $0<x<4$, $0<y<1$, $0<z<1$, $0<w<5$), lithium nitride ($Li_xN_y$, wherein $0<x<4$, $0<y<2$), $SiS_2$ glass ($Li_xSi_yS_z$, wherein $0<x<3$, $0<y<2$, $0<z<4$), $P_2S_5$ glass ($Li_xP_yS_z$, wherein $0\leq x<3$, $0<y<3$, $0<z<7$), $Li_2O$, LiF, LiOH, $Li_2CO_3$, $LiAlO_2$, $Li_2O—Al_2O_3—SiO_2—P_2O_5—TiO_2—GeO_2$ ceramic, garnet ceramic ($Li_{3+x}La_3M_2O12$, wherein $0\leq x\leq 5$, M can be Te, Nb, or Zr), and any combination thereof.

Referring to FIG. 3, in another embodiment, the protection layer 61 can also be disposed on a surface of the porous layer 60 facing away from the positive active material layer 20 or the negative active material layer 30. The protection layer 61 can be a single layer or have a multi-layered structure.

The thickness of the protection layer 61 is 0.1 micrometer to 20 micrometers. When the thickness of the protection layer 61 is greater than or equal to 0.1 micrometer, the protection layer 61 has a certain mechanical strength that can increase the resistance to puncture and suppress the growth of lithium dendrites. When the thickness of the protection layer 61 is less than or equal to 20 micrometers, the protection layer 61 will not suppress the conduction of the lithium ions, thereby controlling the polarization of the battery and ensuring the performance of the battery. When the protection layer 61 is disposed on the porous layer 60, a portion of the protection layer 61 can be inserted into the pores of the porous layer 60, which can further increase the mechanical strength of the composite electrode plate 100. The portion of the protection layer 61 which is inserted into the porous layer 60 has a length of 0.1 micrometer to 20 micrometers.

The porosity of the protection layer 61 is 10% to 40%. The average pore diameter of the protection layer 61 is 0.1 micrometer to 1 micrometer. The electrical resistivity of the protection layer 61 is greater than $10^7$ Ωm, and more specifically, the electrical resistivity of the protection layer 61 can be greater than $10^{10}$ Ωm.

The protection layer 61 and the porous layer 60 can be connected to each other by thermal pressing or by adhesive. When the protection layer 61 and the porous layer 60 are connected by thermal pressing, the temperature for the thermal pressing is less than the melting points of the protection layer 61 and the porous layer 6. The pressure for the thermal pressing is 0.1 Mpa to 1 Mpa. When the protection layer 61 and the porous layer 60 are connected by adhesive, the adhesive can be selected from a group consisting of polyamide, polyurethane, ethylene-vinyl acetate copolymer (EVA), ethylene vinyl alcohol copolymer (EVOH), acrylic ester, polyvinylidene fluoride, and any combination thereof. In other embodiments, the protection layer 61 can also be formed on the porous layer 60 by deposition or coating, and no adhesive is needed.

In other embodiments, the first isolation layer 40 and the second isolation layer 50 can also be polymer layers or ceramic layers formed by blade coating.

In at least one embodiment, the composite current collector 10 includes an insulating layer 11, a first conductive layer 12, and a second conductive layer 13. The insulating layer 11 is disposed between the first conductive layer 12 and the second conductive layer 13. The positive active material layer 20 is connected to a surface of the first conductive layer 12 facing away from the insulating layer 11. The negative active material layer 30 is connected to a surface of the second conductive layer 13 facing away from the insulating layer 11. Each top portion of the first conductive layer 12 and of the second conductive layer 13 protrudes from the positive active material layer 20 and the negative active material layer 30, respectively, to form a blank area (not labeled). Electrode tabs (not shown) can be connected to the blank areas of the first conductive layer 12 and the second conductive layer 13 by soldering for conducting electrons. At this time, the composite current collector 10 is double-sided and having a less thickness compared to the existing current collector made of metal foil, which may be advantageous for the increase of energy density per unit volume. Furthermore, the insulating layer 11 of the composite current collector 10 is more flexible and malleable, fracture during manufacture is greatly reduced. The composite current collector 10 also has less weight compared to that of the existing current collector, which can increase the energy density per unit mass and the safety of the battery cell 400.

Furthermore, the insulating layer 11 can be made of polymers. Specifically, the insulating layer 11 can be made of poly(butylene terephthalate), poly(ethylene naphthalate) (PEN), poly-ether-ether-ketone, polyimide, polyamide, polyethylene glycol, polyamide imide, polycarbonate, cyclic polyolefin, polyphenylene sulfide, polyvinyl acetate, poly tetra fluoroethylene, polynaphthylmethylene, polyvinylidene difluoride, poly(naphthalenedicarboxylic acid), poly propylene carbonate, poly(vinylidene difluoride-co-hexafluoropropylene), poly(vinylidene difluoride-co-chlorotrifluoroethylene), polysiloxane, vinylon, polypropylene, polyethylene, polyvinyl chloride, polystyrene, poly(cyanoarylether), polyurethane, polyphenylene oxide, polyester, polysulfone, and derivatives thereof.

The porosity of the insulating layer 11 is less than or equal to 50%. The pores of the insulating layer 11 can decrease the weight of the composite current collector 10 and increase the loading amount of the effective materials. The surface area of the composite current collector 10 is also increased, which can increase the number of the ion channels (that is, the insulating layer 11 has larger surface area covered by the conductive layer when the conductive layer is formed on the insulating layer 11). Furthermore, when the porosity of the insulating layer 11 is less than or equal to 50%, the insulating layer 11 can prevent the first conductive layer 12 and the second conductive layer 13 permeating into and connecting to each other.

The thickness of the insulating layer 11 is 1 micrometer to 20 micrometers. When the thickness of the insulating layer 11 is less than or equal to 20 micrometers, the composite current collector 10 can have a total thickness no more than the thickness of the existing current collector. Thus, energy density of the battery cell 400 is not reduced. Furthermore, when the thickness of the insulating layer 11 is greater than or equal to 1 micrometer, the insulating layer 11 can have a high mechanical strength and prevent contact between the first conductive layer 12 and the second conductive layer 13.

Furthermore, the first conductive layer 12 and the second conductive layer 13 can be formed by sputtering, vacuum vapor deposition, ion plating, or pulse laser deposition. Since only the insulating layer 11 needs to be cut, metal burrs can be avoided, and reduce the voltage drop within per unit time (K value), and increase the safety of the battery. The first conductive layer 12 and the second conductive layer 13 can be made of a material selected from a group consisting of Ni, Ti, Cu, Ag, Au, Pt, Fe, Co, Cr, W, Mo, Al, Mg, K, Na, Ca, Sr, Ba, Si, Ge, Sb, Pb, In, Zn, and any combination (alloy) thereof. The first conductive layer 12 and the second conductive layer 13 can be made of different materials. In at least one embodiment, the first conductive layer 12 is made of Cu, and the second conductive layer 13 is made of Al. That is, the composite current collector 10 have different materials on opposite surfaces of the insulating layer 11. In other embodiments, the first conductive layer 12 and the second conductive layer 13 can also be made of a same material, for example, the first conductive layer 12 and the second conductive layer 13 are both made of Ni.

The porosity of each of the first conductive layer 12 and the second conductive layer 13 is less than or equal to 60%. The pores of the first conductive layer 12 and the second conductive layer 13 can decrease the weight of the composite current collector 10 and increase the loading amount of the effective material. Furthermore, when the porosity of each of the first conductive layer 12 and the second conductive layer 13 is less than or equal to 60%, the first conductive layer 12 and the second conductive layer 13 can prevent elongation of the electron channels (elongation of the electron channels can affect the conducting capability of the electrons and reduce the performance of the battery cell 400).

The thickness of each of the first conductive layer 12 and the second conductive layer 13 is 0.1 micrometer to 10 micrometers. When the thickness of each of the first conductive layer 12 and the second conductive layer 13 is less than or equal to 10 micrometers, the composite current collector 10 can have a total thickness no more than the thickness of the existing current collector. Thus, the energy density of the battery cell 400 can be ensured, and the manufacturing efficiency can be increased. Furthermore, when the thickness of each of the first conductive layer 12 and the second conductive layer 13 is greater than or equal to 0.1 micrometer, the first conductive layer 12 and the second conductive layer 13 can have a high performance in conducting electrons to ensure the performance of the battery cell 400.

A ratio of the thickness of the insulating layer 11 with respect to the thickness of the first conductive layer 12 or the second conductive layer 13 is 0.1 to 400.

Figure 4A:
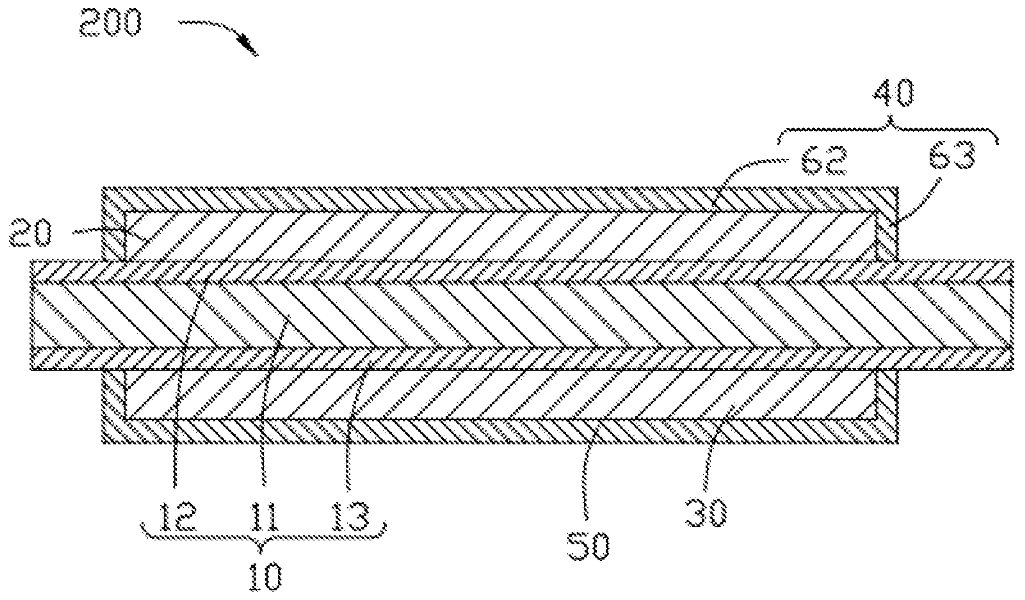
FIG. 4A is a cross-sectional view of another embodiment of a composite electrode plate.
Figure 4B:
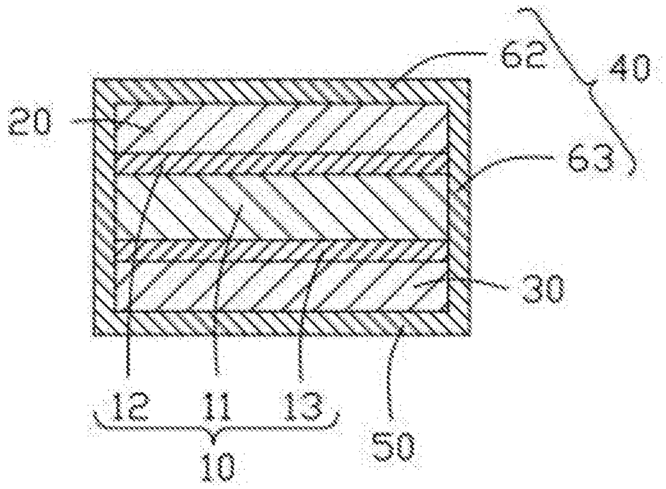
FIG. 4B is a cross-sectional view of the composite electrode plate of FIG. 4A from another angle.

FIGS. 4A and 4B illustrate another embodiment of a composite electrode plate 200. Different from the composite electrode plate 100, the first isolation layer 40 and/or the second isolation layer 50 of the composite electrode plate 200 can further include an isolation portion 62 and an extension portion 63. The isolation portion 62 corresponds to the positive active material layer 20 or the negative active material layer 30. The extension portion 63 extends from edges of the isolation portion 62, and surrounds the edges of the positive active material layer 20 and/or the negative active material layer 30. That is, the first isolation layer 40 and/or the second isolation layer 50 have a circular structure, which can prevent the active material/powders at the edges of the positive active material layer 20 or the negative active material layer 30 from disconnecting from the first isolation layer 40 and/or the second isolation layer 50, and avoiding short circuits and improving safety. Furthermore, referring to FIG. 4B, the extension portion 63 can further surround two opposite edges of the composite current collector 10 parallel to the lengthwise direction of the composite electrode plate 200.

Figure 5:
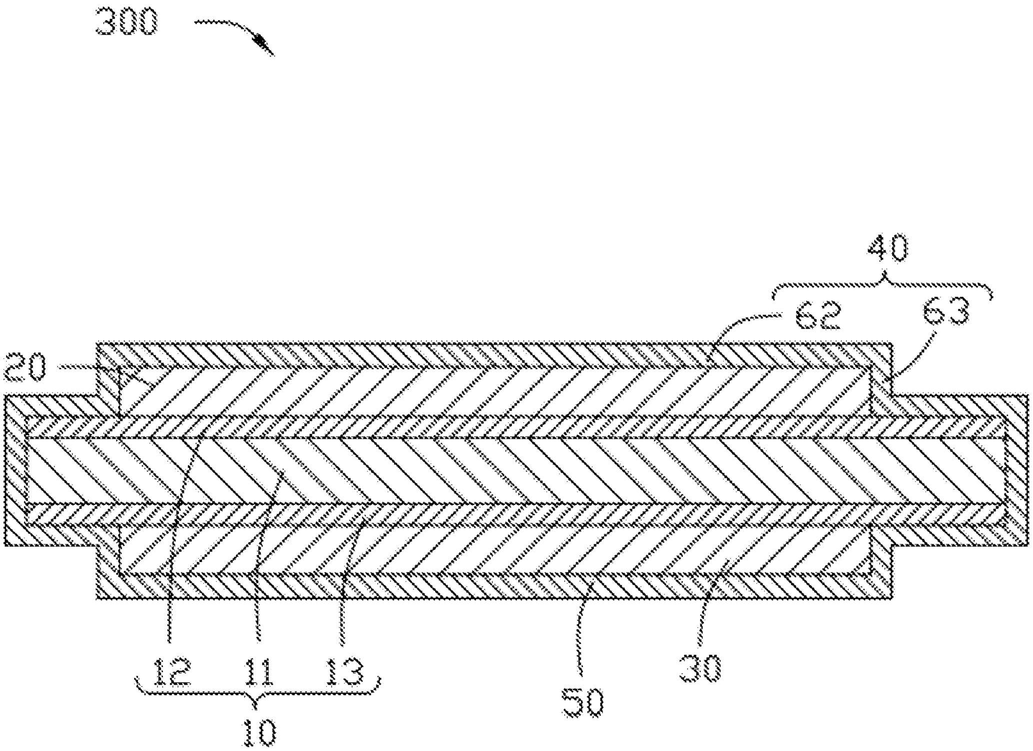
FIG. 5 is a cross-sectional view of yet another embodiment of a composite electrode plate.

FIG. 5 illustrates yet another embodiment of a composite electrode plate 300. The first isolation layer 40 and/or the second isolation layer 50 of the composite electrode plate 300 also include an isolation portion 62 and an extension portion 63. Different from the composite electrode plate 200, the extension portion 63 of the composite electrode plate 300 surrounds each edge of the composite current collector 10 and the blank areas. By extending the extension portion 63 to each edge of the composite current collector 10, the safety of the battery can be further improved.

Figure 6:
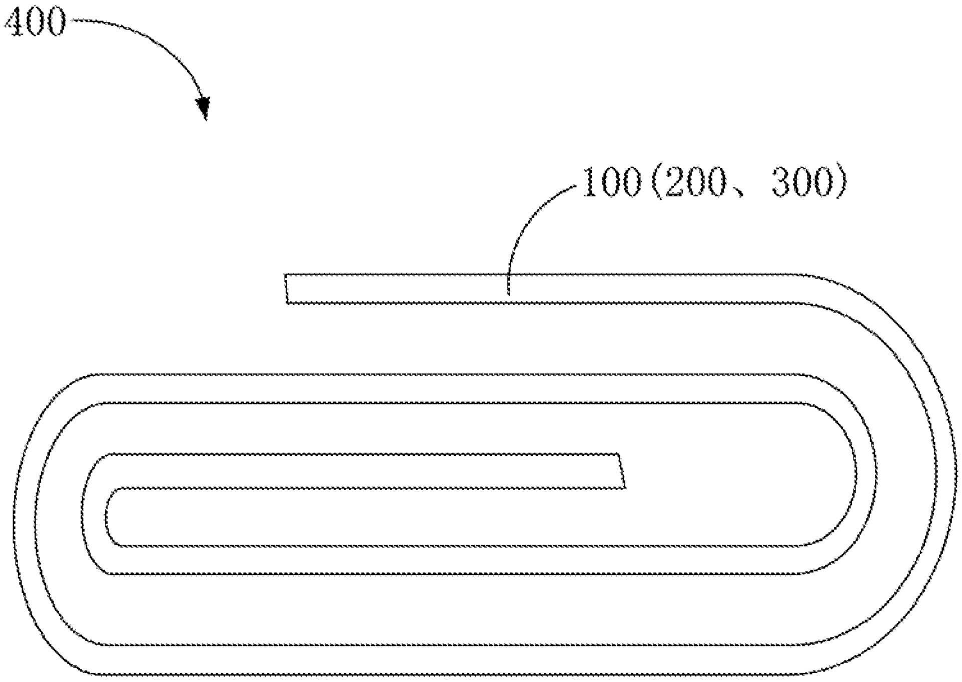
FIG. 6 is a top view of an embodiment of a battery cell.

FIG. 6 illustrates an embodiment of a battery cell 400. The battery cell 400 includes the composite electrode plate(s) 100, 200, or 300. The battery cell 400 is formed by winding the composite electrode plate 100, 200, or 300 or by stacking the composite electrode plates 100, 200, or 300. In manufacture, the battery cell 400 is further filled with electrolyte, then encapsulated and formatted to obtain the finished battery.

Embodiment 1

Composite current collector (having different materials on opposite surfaces of the insulating layer) preparation: Cu layer (thickness of 0.5 micrometers) and Al layer (thickness of 0.5 micrometers) were formed on two opposite surfaces of the PET film (thickness of 12 micrometers) by vacuum vapor deposition. The Cu layer and the Al layer functioned as the negative current collector and the positive current collector.

Composite electrode plate preparation: $LiCoO_2$, Super P, and PVDF, in a ratio of 97.5:1.0:1.5 by weight, were mixed to form the positive active material. N-methylpyrrolidone (NMP) was added into the positive active material to form a slurry with a solid content of 75%. The slurry was stirred and then coated on the Al layer of the composite current collector, dried at 90 degrees Celsius, and cold pressed to form the positive active material layer. Graphite, Super P, and styrene butadiene rubber (SBR), in a ratio of 96:1.5:2.5 by weight, were mixed to form the negative active material. Deionized water was added into the negative active material to form a slurry with a solid content of 70%. The slurry was stirred and then coated on the Cu layer of the composite current collector, dried at 110 degrees Celsius, and cold pressed to form the negative active material layer. Electrode tabs were connected to the composite current collector, and adhesive was applied to the negative electrode tabs. Moreover, a PVDF non-woven fabric layer (thickness of 2.5 micrometers, fibers' average diameter of 10 nanometers, porosity of 80%) was formed on each of the positive and the negative active material layers by electrospinning. Then, the composite electrode plate was obtained.

Electrolyte preparation: ethylene carbonate (EC), ethyl methyl carbonate (EMC), and diethyl carbonate (DEC), in a ratio of 30:50:20 by weight, were mixed to form an organic solvent, and lithium hexafluorophosphate ($LiPF_6$) was uniformly dissolved in the organic solvent, thereby obtaining the electrolyte. The $LiPF_6$ in the electrolyte has a concentration of 1.15M.

Lithium battery preparation: the composite electrode plate was wound to form the battery cell. The battery cell was filled with electrolyte and encapsulated. The battery cell was further formatted, through 0.2C (constant current) charging to 3.3V and 0.1C (constant current) charging to 3.6V, and then tested. The soft pack lithium battery was obtained.

Embodiment 2

Composite current collector (having different materials on opposite surfaces of the insulating layer) preparation: steps were the same as those of the embodiment 1.

Composite electrode plate preparation: the average diameter of the fibers in PVDF non-woven fabric layer was 100 nanometers. Other steps were the same as those of the embodiment 1.

Electrolyte preparation: steps were the same as those of the embodiment 1.

Lithium battery preparation: steps were the same as those of the embodiment 1.

Embodiment 3

Composite current collector (having different materials on opposite surfaces of the insulating layer) preparation: steps were the same as those of the embodiment 1.

Composite electrode plate preparation: the average diameter of the fibers in PVDF non-woven fabric layer was 500 nanometers. Other steps were the same as those of the embodiment 1.

Electrolyte preparation: steps were the same as those of the embodiment 1.

Lithium battery preparation: steps were the same as those of the embodiment 1.

Embodiment 4

Composite current collector (having different materials on opposite surfaces of the insulating layer) preparation: steps were the same as those of the embodiment 1.

Composite electrode plate preparation: the average diameter of the fibers in PVDF non-woven fabric layer was 2000 nanometers. Other steps were the same as those of the embodiment 1.

Electrolyte preparation: steps were the same as those of the embodiment 1.

Lithium battery preparation: steps were the same as those of the embodiment 1.

Embodiment 5

Composite current collector (having different materials on opposite surfaces of the insulating layer) preparation: steps were the same as those of the embodiment 1.

Composite electrode plate preparation: a PVDF non-woven fabric layer (thickness of 1 micrometer, fibers' average diameter of 100 nanometers) was first formed on each of the positive and the negative active material layers by electrospinning. Then, another PVDF non-woven fabric layer (thickness of 1.5 micrometer, average diameter of fibers was 1000 nanometers) was then formed on each of the positive and the negative active material layers by air spinning. That is, the non-woven fabric layer had a double-layered structure, and the porosity of the non-woven fabric layer was 80%. Other steps were the same as those of the embodiment 1.

Electrolyte preparation: steps were the same as those of the embodiment 1.

Lithium battery preparation: steps were the same as those of the embodiment 1.

Embodiment 6

Composite current collector (having different materials on opposite surfaces of the insulating layer) preparation: steps were the same as those of the embodiment 2.

Composite electrode plate preparation: the thickness of the PVDF non-woven fabric layer was 0.5 micrometers. Other steps were the same as those of the embodiment 2.

Electrolyte preparation: steps were the same as those of the embodiment 2.

Lithium battery preparation: steps were the same as those of the embodiment 2.

Embodiment 7

Composite current collector (having different materials on opposite surfaces of the insulating layer) preparation: steps were the same as those of the embodiment 2.

Composite electrode plate preparation: the thickness of the PVDF non-woven fabric layer was 5 micrometers. Other steps were the same as those of the embodiment 2.

Electrolyte preparation: steps were the same as those of the embodiment 2.

Lithium battery preparation: steps were the same as those of the embodiment 2.

Embodiment 8

Composite current collector (having different materials on opposite surfaces of the insulating layer) preparation: steps were the same as those of the embodiment 2.

Composite electrode plate preparation: the thickness of the PVDF non-woven fabric layer was 10 micrometers. Other steps were the same as those of the embodiment 2.

Electrolyte preparation: steps were the same as those of the embodiment 2.

Lithium battery preparation: steps were the same as those of the embodiment 2.

Embodiment 9

Composite current collector (having different materials on opposite surfaces of the insulating layer) preparation: steps were the same as those of the embodiment 7.

Composite electrode plate preparation: the porosity of the PVDF non-woven fabric layer was 30%. Other steps were the same as those of the embodiment 7.

Electrolyte preparation: steps were the same as those of the embodiment 7.

Lithium battery preparation: steps were the same as those of the embodiment 7.

Embodiment 10

Composite current collector (having different materials on opposite surfaces of the insulating layer) preparation: steps were the same as those of the embodiment 7.

Composite electrode plate preparation: the porosity of the PVDF non-woven fabric layer was 75%. Other steps were the same as those of the embodiment 7.

Electrolyte preparation: steps were the same as those of the embodiment 7.

Lithium battery preparation: steps were the same as those of the embodiment 7.

Embodiment 11

Composite current collector (having different materials on opposite surfaces of the insulating layer) preparation: steps were the same as those of the embodiment 7.

Composite electrode plate preparation: the porosity of the PVDF non-woven fabric layer was 95%. Other steps were the same as those of the embodiment 7.

Electrolyte preparation: steps were the same as those of the embodiment 7.

Lithium battery preparation: steps were the same as those of the embodiment 7.

Embodiment 12

Composite current collector (having different materials on opposite surfaces of the insulating layer) preparation: steps were the same as those of the embodiment 10.

Composite electrode plate preparation: the non-woven fabric layer was made of PAN. Other steps were the same as those of the embodiment 10.

Electrolyte preparation: steps were the same as those of the embodiment 10.

Lithium battery preparation: steps were the same as those of the embodiment 10.

Embodiment 13

Composite current collector (having different materials on opposite surfaces of the insulating layer) preparation: steps were the same as those of the embodiment 10.

Composite electrode plate preparation: the non-woven fabric layer was made of PEO. Other steps were the same as those of the embodiment 10.

Electrolyte preparation: steps were the same as those of the embodiment 10.

Lithium battery preparation: steps were the same as those of the embodiment 10.

Embodiment 14

Composite current collector (having different materials on opposite surfaces of the insulating layer) preparation: steps were the same as those of the embodiment 10.

Composite electrode plate preparation: the PVDF non-woven fabric layer had a circular structure that surrounded all the edges of the positive and the negative active material layers and two edges of the composite current collector parallel to the lengthwise direction of the composite electrode plate. Other steps were the same as those of the embodiment 10.

Electrolyte preparation: steps were the same as those of the embodiment 10.

Lithium battery preparation: steps were the same as those of the embodiment 10.

Embodiment 15

Composite current collector (having different materials on opposite surfaces of the insulating layer) preparation: steps were the same as those of the embodiment 10.

Composite electrode plate preparation: the circular PVDF non-woven fabric layer that surrounded all external surfaces of the composite electrode plate. Other steps were the same as those of the embodiment 10.

Electrolyte preparation: steps were the same as those of the embodiment 10.

Lithium battery preparation: steps were the same as those of the embodiment 10.

Embodiment 16

Composite current collector (having different materials on opposite surfaces of the insulating layer) preparation: after forming the Cu layer and the Al layer by steps which were the same as those of the embodiment 15, primary coating layers were further formed on the Cu layer and the Al layer. Specifically, Super P and SBR, in a ratio of 95:5 by weight, were mixed. Deionized water was added to form a slurry with a solid content of 80%. The slurry was stirred and then coated on the Cu layer of the composite current collector, dried at 110 degrees Celsius, and cold pressed to form the primary coating layer on the Cu layer. Moreover, Super P and SBR, in a ratio of 97:3 by weight, were mixed. Deionized water was added to form a slurry with a solid content of 85%. The slurry was stirred and then coated on the Al layer of the composite current collector, dried at 110 degrees Celsius, and cold pressed to form the primary coating layer on the Al layer.

Composite electrode plate preparation: steps were the same as those of the embodiment 15.

Electrolyte preparation: steps were the same as those of the embodiment 15.

Lithium battery preparation: steps were the same as those of the embodiment 15.

Embodiment 17

Composite current collector (having different materials on opposite surfaces of the insulating layer) preparation: steps were the same as those of the embodiment 16.

Composite electrode plate preparation: after forming the PVDF non-woven fabric layer by steps that were the same as those of the embodiment 16, the protection layer were further formed on each PVDF non-woven fabric layer. Specifically, $Al_2O_3$ ceramic particles and PVDF, in a ratio of 95:5 by weight, were mixed. NMP was further added to form a slurry with a solid content of 80%. The slurry was stirred and then coated on each PVDF non-woven fabric layer, and dried under 90 degrees Celsius to form the protection layer (thickness of 3 micrometers, porosity of 30%, average pore diameter less than 1 micrometer).

Electrolyte preparation: steps were the same as those of the embodiment 16.

Lithium battery preparation: steps were the same as those of the embodiment 16.

Embodiment 18

Composite current collector (having different materials on opposite surfaces of the insulating layer) preparation: steps were the same as those of the embodiment 16.

Composite electrode plate preparation: after forming the PVDF non-woven fabric layer by steps that were the same as those of the embodiment 16, the protection layer were further formed on each PVDF non-woven fabric layer. Specifically, $ZnO_2$ ceramic particles and polyurethane, in a ratio of 95:5 by weight, were mixed. NMP was further added to form a slurry with a solid content of 80%. The slurry was stirred and then coated on each PVDF non-woven fabric layer, and dried under 90 degrees Celsius to form the protection layer (thickness of 3 micrometers, porosity of 30%, average pore diameter less than 1 micrometer).

Electrolyte preparation: steps were the same as those of the embodiment 16.

Lithium battery preparation: steps were the same as those of the embodiment 16.

Embodiment 19

Composite current collector (having different materials on opposite surfaces of the insulating layer) preparation: steps were the same as those of the embodiment 17.

Composite electrode plate preparation: The porosity of the protection layer was 30%. Other steps were the same as those of the embodiment 17.

Electrolyte preparation: steps were the same as those of the embodiment 17.

Lithium battery preparation: steps were the same as those of the embodiment 17.

Embodiment 20

Composite current collector (having different materials on opposite surfaces of the insulating layer) preparation: steps were the same as those of the embodiment 17.

Composite electrode plate preparation: The thickness of the protection layer was 2 micrometers. Other steps were the same as those of the embodiment 17.

Electrolyte preparation: steps were the same as those of the embodiment 17.

Lithium battery preparation: steps were the same as those of the embodiment 17.

Embodiment 21

Composite current collector (having different materials on opposite surfaces of the insulating layer) preparation: steps were the same as those of the embodiment 1.

Composite electrode plate preparation: The PVDF non-woven fabric layer was formed by blade coating. The thickness of the PVDF non-woven fabric layer was 5 micrometers, and the porosity of the PVDF non-woven fabric layer was 3%. Other steps were the same as those of the embodiment 1.

Electrolyte preparation: steps were the same as those of the embodiment 1.

Lithium battery preparation: steps were the same as those of the embodiment 1.

Comparative Embodiment 1

Negative electrode plate preparation: graphite, Super P, and SBR, in a ratio of 96:1.5:2.5 by weight, were mixed to form the negative active material. Deionized water was added into the negative active material to form a slurry with a solid content of 70%. The slurry was stirred and then coated on opposite surfaces of a negative current collector (Cu foil), dried at 110 degrees Celsius, and cold pressed to form the negative electrode plate.

Positive electrode plate preparation: $LiCoO_2$, Super P, and PVDF, in a ratio of 97.5:1.0:1.5 by weight, were mixed to form the negative active material. NMP was added into the positive active material to form a slurry with a solid content of 75%. The slurry was stirred and then coated on two opposite surfaces of a positive current collector (Al foil), dried at 90 degrees Celsius, and cold pressed to form the positive electrode plate.

Electrolyte preparation: steps were the same as those of the embodiment 1.

Lithium battery preparation: a PE film, with a thickness of 15 micrometers, functioned as an isolation film. The positive electrode plate, the isolation film, and the negative film were stacked in that order and wound to form the battery cell. Other steps were the same as those of the embodiment 1.

Comparative Embodiment 2

Composite current collector preparation: steps were the same as those of the embodiment 1.

Electrode plate preparation: after forming the positive active material layer, the negative active material layer and the electrode tabs by steps that were the same as those of the embodiment 1, thereby the electrode plate was obtained. That is, no PVDF non-woven fabric layer was formed.

Lithium battery preparation: a PE film, with a thickness of 15 micrometers, functioned as an isolation film. The electrode plate and the isolation film were wound to form the battery cell. Other steps were the same as those of the embodiment 1.

The bonding strength between the isolation layer and the active material layer of each lithium battery prepared by embodiments 1-21 and comparative embodiments 1-2 was tested. The electrochemical properties of each lithium battery were further tested. The testing of the bonding strength was performed by taking the composite electrode plate out from the battery cell, cutting the composite electrode plate to obtain a strip with a width of 2 cm, and pulling the isolation layer until the isolation layer was inclined by 180 degrees with respect to the active material layer. Then, the pulling force was tested, and a ratio of the pulling force and the width of the composite electrode plate was determined and established as the bonding strength. The preparing conditions in embodiments 1-21 and comparative embodiments 1-2 and the testing results are shown in Table 1.

TABLE 1

| | | Fiber diameter of porosity layer (nm) | Total thickness of porosity layer/blade coating layer/isolation film (μm) | Porosity of porosity layer/blade coating layer/isolation film | Material of porosity layer/blade coating layer/isolation film | Material of protection layer | Isolation layer surround | Porosity of protection layer |
|---|---|---|---|---|---|---|---|---|
| Embodiment 1 | Isolation layer (porosity layer) | 10 | 5 | 80% | PVDF | — | No | — |
| Embodiment 2 | Isolation layer (porosity layer) | 100 | 5 | 80% | PVDF | — | No | — |
| Embodiment 3 | Isolation layer (porosity layer) | 500 | 5 | 80% | PVDF | — | No | — |
| Embodiment 4 | Isolation layer (porosity layer) | 2000 | 5 | 80% | PVDF | — | No | — |
| Embodiment 5 | Isolation layer (porosity layer) | 100; 1000 | 5 | 80% | PVDF | — | No | — |
| Embodiment 6 | Isolation layer (porosity layer) | 100 | 1 | 80% | PVDF | — | No | — |
| Embodiment 7 | Isolation layer (porosity layer) | 100 | 10 | 80% | PVDF | — | No | — |
| Embodiment 8 | Isolation layer (porosity layer) | 100 | 20 | 80% | PVDF | — | No | — |
| Embodiment 9 | Isolation layer (porosity layer) | 100 | 10 | 30% | PVDF | — | No | — |
| Embodiment 10 | Isolation layer (porosity layer) | 100 | 10 | 75% | PVDF | — | No | — |
| Embodiment 11 | Isolation layer (porosity layer) | 100 | 10 | 95% | PVDF | — | No | — |
| Embodiment 12 | Isolation layer (porosity layer) | 100 | 10 | 75% | PAN | — | No | — |
| Embodiment 13 | Isolation layer (porosity layer) | 100 | 10 | 75% | PEO | — | No | — |
| Embodiment 14 | Isolation layer (porosity layer) | 100 | 10 | 75% | PVDF | — | No | — |
| Embodiment 15 | Isolation layer (porosity layer) | 100 | 10 | 75% | PVDF | — | Yes | — |
| Embodiment 16 | Isolation layer (porosity layer) | 100 | 10 | 75% | PVDF | — | Yes | — |
| Embodiment 17 | Isolation layer (porosity layer + protection layer) | 100 | 10 | 75% | PVDF | $Al_2O_3$ | Yes | 30% |

TABLE 1-continued

| | | | | | | | | |
|---|---|---|---|---|---|---|---|---|
| Embodiment 18 | Isolation layer (porosity layer + protection layer) | 100 | 10 | 75% | PVDF | $ZnO_2$ | Yes | 30% |
| Embodiment 19 | Isolation layer (porosity layer + protection layer) | 100 | 10 | 75% | PVDF | $Al_2O_3$ | Yes | 15% |
| Embodiment 20 | Isolation layer (porosity layer + protection layer) | 100 | 10 | 75% | PVDF | $Al_2O_3$ | Yes | 30% |
| Embodiment 21 | Isolation layer (blading coating) | — | 10 | 3% | PVDF | — | — | — |
| Comparative Embodiment 1 | Independent isolation film | — | 15 | 30% | PE | — | — | — |
| Comparative Embodiment 2 | Independent isolation film | — | 15 | 30% | PE | — | — | — |

| | Thickness of protection layer (μm) | Bonding force to positive active material layer (N/m) | Bonding force to negative active material layer (N/m) | Self-changing rate (mV/h) | Energy density undue 0.1 C (Wh/L) | Discharge capacity after 50 cycles/ initial discharge capacity |
|---|---|---|---|---|---|---|
| Embodiment 1 | — | 10.4 | 6.5 | 0.052 | 682 | 93.6% |
| Embodiment 2 | — | 10.0 | 6.2 | 0.064 | 688 | 94.1% |
| Embodiment 3 | — | 6.3 | 4.0 | 0.095 | 690 | 94.3% |
| Embodiment 4 | — | 2.9 | 1.7 | 0.294 | 692 | 94.6% |
| Embodiment 5 | — | 10.7 | 6.7 | 0.066 | 690 | 94.4% |
| Embodiment 6 | — | 5.7 | 3.5 | 0.472 | 665 | 95.6% |
| Embodiment 7 | — | 10.7 | 6.8 | 0.057 | 685 | 93.7% |
| Embodiment 8 | — | 11.1 | 7.1 | 0.025 | 667 | 89.4% |
| Embodiment 9 | — | 12.4 | 7.7 | 0.013 | 653 | 81.6% |
| Embodiment 10 | — | 10.5 | 6.7 | 0.057 | 684 | 93.6% |
| Embodiment 11 | — | 6.0 | 3.7 | 0.192 | 691 | 95.0% |
| Embodiment 12 | — | 8.1 | 4.8 | 0.065 | 681 | 94.5% |
| Embodiment 13 | — | 9.5 | 6.2 | 0.062 | 677 | 92.2% |
| Embodiment 14 | — | 10.3 | 6.5 | 0.032 | 687 | 93.7% |
| Embodiment 15 | — | 10.3 | 6.5 | 0.030 | 688 | 93.7% |
| Embodiment 16 | — | 10.2 | 6.4 | 0.030 | 695 | 95.4% |
| Embodiment 17 | 3 | 10.1 | 6.3 | 0.024 | 676 | 95.3% |
| Embodiment 18 | 3 | 10.3 | 6.4 | 0.025 | 674 | 95.2% |
| Embodiment 19 | 3 | 10.1 | 6.2 | 0.022 | 669 | 92.9% |
| Embodiment 20 | 2 | 10.0 | 6.3 | 0.026 | 683 | 95.5% |
| Embodiment 21 | — | 6.5 | 3.6 | 0.063 | 641 | 83.5% |
| Comparative Embodiment 1 | — | 0.8 | 0.5 | 0.031 | 623 | 92.3% |
| Comparative Embodiment 2 | — | 0.9 | 0.5 | 0.046 | 649 | 92.2% |

Table 1 shows that the batteries prepared by embodiments 1-21 have stronger bonding strengths between the isolation layer and the active material layer by incorporating no isolation film into the battery cell, and the battery cell has a greater cycling retention capacity. These results are in comparison to the batteries prepared by comparative embodiments 1-2. The isolation layer of the battery prepared by embodiment 9 has a smallest porosity (equal to the porosity of the isolation film of the batteries prepared by comparative embodiments 1-2). However, since the stronger bonding strength of the isolation layer of the battery prepared by embodiment 9 may slow down the lithium ion transmission, the battery prepared by embodiment 9 has a lower cycling property compared to the batteries prepared by comparative embodiments 1-2. Compared to embodiment 21, the isolation layer of embodiment 1 has greater porosity, greater bonding strength, and decreased thickness, and the battery of the embodiment 1 has a greater cycling retention capacity.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A composite electrode plate comprising:

a composite current collector;

a positive active material layer;

a negative active material layer, the composite current collector is disposed between the positive active material layer and the negative active material layer;

a first isolation connected to a surface of the positive active material layer away from the composite current collector; and a second isolation layer connected to a surface of the negative active material layer away from the composite current collector; wherein the composite current collector comprises:

an insulating layer;

a first conductive layer; and a second conductive layer, the insulating layer is disposed between the first conductive layer and the second conductive layer, and the first conductive layer is made of a material selected from a group consisting of Ni, Ti, Cu, Ag, Au, Pt, Fe, Co, Cr, W, Mo, Al, Mg, K, Na, Ca, Sr, Ba, Si, Ge, Sb, Pb, In, Zn, and any combination thereof; the second conductive layer is made of a material selected from a group consisting of Ni, Ti, Cu, Ag, Au, Pt, Fe, Co, Cr, W, Mo, Al, Mg, K, Na, Ca, Sr, Ba, Si, Ge, Sb, Pb, In, Zn, and any combination thereof.

2. The composite electrode plate of claim 1, wherein each of the first isolation layer and the second isolation layer comprises a porous layer.

3. The composite electrode plate of claim 1, wherein the positive active material layer is connected to a surface of the first conductive layer away from the insulating layer, and the negative active material layer is connected to a surface of the second conductive layer away from the insulating layer.

4. The composite electrode plate of claim 1, wherein at least one of the first isolation layer and the second isolation layer comprises an isolation portion and an extension portion, and the isolation portion corresponds to the positive active material layer or the negative active material layer, and the extension portion extends from edges of the isolation portion, and surrounds edges of at least one of the positive active material layer and the negative active material layer.

5. The composite electrode plate of claim 4, wherein the extension portion further surrounds edges of the composite current collector.

6. The composite electrode plate of claim 2, wherein the porous layer is made of a material selected from a group consisting of polyvinylidene difluoride, polyvinylidene fluoride, polyimide, polyamide, polyacrylonitrile, polyethylene glycol, polyphenylene oxide, polyoxyethylene, polyethylene oxide, poly propylene carbonate, polymethyl methacrylate, polyethylene terephthalate, poly(vinylidene difluoride-co-hexafluoropropylene), poly(vinylidene fluoride-hexafluoropropylene), poly(vinylidene difluoride-co-chlorotrifluoroethylene), and derivatives thereof.

7. The composite electrode plate of claim 2, wherein at least one of the first isolation layer and the second isolation layer further comprises a protection layer, and the protection layer fills in pores of the porous layer.

8. The composite electrode plate of claim 7, wherein the protection layer comprises inorganic material selected from a group consisting of oxide, hydroxide, lithium compound, and any combination thereof.

9. The composite electrode plate of claim 2, wherein at least one of the first isolation layer and the second isolation layer further comprises a protection layer, and the protection layer is disposed on a surface of the porous layer away from the positive active material layer or the negative active material layer.

10. The composite electrode plate of claim 9, wherein a thickness of the porosity layer is 1 micrometer to 20 micrometers, and a thickness of the protection layer is 0.1 micrometer to 20 micrometers.

11. A battery cell comprising:

a composite electrode plate, the composite electrode plate wound or stacked to form the battery cell, the composite electrode plate comprising:
- a composite current collector;
- a positive active material layer;
- a negative active material layer, the composite current collector is disposed between the positive active material layer and the negative active material layer;
- a first isolation layer connected to a surface of the positive active material layer away from the composite current collector; and
- a second isolation layer connected to a surface of the negative active material layer away from the composite current collector; wherein the composite current collector comprises:

an insulating layer;

a first conductive layer; and a second conductive layer, the insulating layer is disposed between the first conductive layer and the second conductive layer, and the first conductive layer is made of a material selected from a group consisting of Ni, Ti, Cu, Ag, Au, Pt, Fe, Co, Cr, W, Mo, Al, Mg, K, Na, Ca, Sr, Ba, Si, Ge, Sb, Pb, In, Zn, and any combination thereof; the second conductive layer is made of a material selected from a group consisting of Ni, Ti, Cu, Ag, Au, Pt, Fe, Co, Cr, W, Mo, Al, Mg, K, Na, Ca, Sr, Ba, Si, Ge, Sb, Pb, In, Zn, and any combination thereof.

12. The battery cell of claim 11, wherein each of the first isolation layer and the second isolation layer comprises a porous layer.

13. The battery cell of claim 11, wherein the positive active material layer is connected to a surface of the first conductive layer away from the insulating layer, and the negative active material layer is connected to a surface of the second conductive layer away from the insulating layer.

14. The battery cell of claim 11, wherein at least one of the first isolation layer and the second isolation layer comprises an isolation portion and an extension portion, the isolation portion corresponds to the positive active material layer or the negative active material layer, the extension portion extends from edges of the isolation portion, and surrounds edges of at least one of the positive active material layer and the negative active material layer.

15. The battery cell of claim 14, wherein the extension portion further surrounds edges of the composite current collector.

16. The battery cell of claim 12, wherein the porous layer is made of a material selected from a group consisting of polyvinylidene difluoride, polyvinylidene fluoride, polyimide, polyamide, polyacrylonitrile, polyethylene glycol, polyphenylene oxide, polyoxyethylene, polyethylene oxide, poly propylene carbonate, polymethyl methacrylate, polyethylene terephthalate, poly(vinylidene difluoride-co-hexafluoropropylene), poly(vinylidene fluoride-hexafluoropropylene), poly(vinylidene difluoride-co-chlorotrifluoroethylene), and derivatives thereof.

17. The battery cell of claim 12, wherein at least one of the first isolation layer and the second isolation layer further comprises a protection layer, and the protection layer fills in pores of the porous layer.

18. The battery cell of claim 17, wherein the protection layer comprises inorganic material selected from a group consisting of oxide, hydroxide, lithium compound, and any combination thereof.

19. The battery cell of claim 12, wherein at least one of the first isolation layer and the second isolation layer further comprises a protection layer, and the protection layer is disposed on a surface of the porous layer away from the positive active material layer or the negative active material layer.

20. The battery cell of claim 19, wherein a thickness of the porosity layer is 1 micrometer to 20 micrometers, and a thickness of the protection layer is 0.1 micrometer to 20 micrometers.

* * * * *